United States Patent [19]

Darvill

[11] Patent Number: 5,174,240
[45] Date of Patent: Dec. 29, 1992

[54] LIVESTOCK TRAILER WITH CATCH GATE

[76] Inventor: Steve Darvill, 2514 J. Sparks Dr., Edmonton, Ky. 42129

[21] Appl. No.: 898,566

[22] Filed: Jun. 15, 1992

[51] Int. Cl.⁵ .......................... A01K 15/00; B61D 3/00
[52] U.S. Cl. ......................................... 119/7; 119/155; 296/24.2
[58] Field of Search ...................... 119/7, 8, 11, 99, 98, 119/147.1, 155, 20; 296/24.2

[56] References Cited

U.S. PATENT DOCUMENTS

| 745,170 | 11/1903 | Eppley | 119/11 |
|---|---|---|---|
| 3,574,388 | 4/1971 | Stone | 296/24.2 |
| 3,623,456 | 11/1971 | Priefert | 119/98 |
| 3,683,864 | 8/1972 | Priefert | 119/99 |
| 3,777,715 | 12/1973 | Hill et al. | 119/99 |
| 3,929,104 | 12/1975 | Corbin | 119/99 |
| 4,048,961 | 9/1977 | Priefert | 119/96 |
| 4,328,643 | 5/1982 | Bell | 119/155 |
| 4,339,147 | 7/1982 | Kimzey | 119/11 |
| 4,530,538 | 7/1985 | Greene et al. | 119/7 |
| 4,569,309 | 2/1986 | Wilson | 119/99 |
| 4,898,121 | 2/1990 | Reynolds | 119/155 |
| 5,138,981 | 8/1992 | Akins | 119/99 |

Primary Examiner—John G. Weiss
Attorney, Agent, or Firm—Camoriano & Smith

[57] ABSTRACT

A livestock transport trailer includes an entrance gate and a catch gate mounted at the same end of the trailer so that animals can enter the trailer through the entrance gate and leave the trailer through the catch gate.

12 Claims, 4 Drawing Sheets

LIVESTOCK TRAILER WITH CATCH GATE

BACKGROUND OF THE INVENTION

The present invention relates to livestock transport trailers, and, in particular, to an adaptation for a livestock transport trailer that will permit the trailer to be used for holding and treating livestock in addition to transporting the livestock.

Livestock transport trailers are well-known. The most popular trailers are those with a "gooseneck" hitch, which connects to the bed of a truck. Most cattle ranchers have these trailers and use them to transport cattle from one field to another, from the ranch to market, and so forth, but livestock transport trailers are not currently designed to be used as a means for securing livestock for medical treatment.

Many types of treatment are given to livestock. They are given shots, branded, de-horned, castrated, inspected for illness or injury, and so forth. In order to give livestock these treatments, the livestock must be caught and held securely during the treatment. Catch gates are known and are used for that purpose. Most catch gates are stationary and are simply mounted across an opening in a fence out in the field. Some catch gates are portable and are mounted at the end of a portable chute that can be transported from one field to another and then inserted across an opening in a fence. The portable chute is then lowered to ground level so that it can support the weight of the cattle and so that the cattle can enter and leave the chute at ground level. Then, it is necessary to herd the cattle into a confined space adjacent to that opening and then release them one at a time through the opening, catching each one as it passes through the catch gate and treating the animal before releasing it into the open field.

Creating the confined space and herding the cattle into the confined space is hard work, requiring a substantial amount of time and labor. Generally, at least two and preferably more people are needed to do the job.

SUMMARY OF THE INVENTION

The present invention is a new device and technique for securing and treating cattle or other livestock which provides a substantial savings of time, labor, and equipment over the prior art.

In the present invention, a catch gate is installed across part of the opening at the end of the transport trailer, so that the cattle can be secured and treated as they leave the transport trailer. Since cattle are generally put into trailers and transported several times during their lives, this arrangement saves substantial labor and equipment costs as well as time, because it means that the cattle only have to be handled once for transport and treatment, and a single person can handle the entire operation.

While the present invention may appear in hindsight to be a simple adaptation of an existing piece of equipment, it is in fact substantially different from anything that has been done before and represents a great improvement in terms of savings of time and labor.

DESCRIPTION OF THE PREFERRED EMBODIMENT

Figure 1:
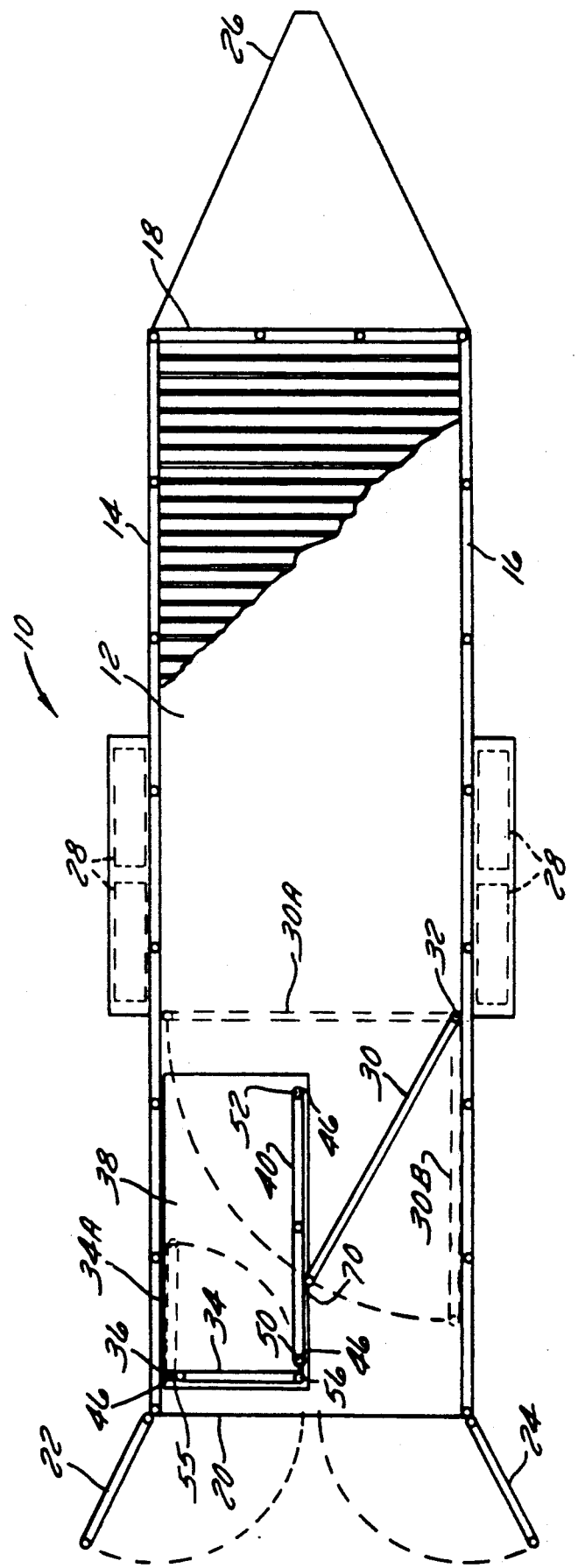
FIG. 1 is a schematic plan view of a livestock transport trailer including the present invention but with the top of the trailer removed for clarity.

As shown in FIGS. 1-5, the transport trailer 10 of the present invention includes a floor 12, a left side 14, a right side 16, a closed front end 18, and a back end 20, which has two doors or gates 22, 24 which, when closed, close off the back end of the trailer, preventing the cattle or other livestock from leaving the trailer 10. At the front of the trailer 10 beyond the closed front end 18, is a trailer hitch 26, which permits the trailer 10 to be connected to a truck for towing.

The trailer 10 also has four wheels 28, which support the trailer and permit it to travel on the road. Inside the trailer 10 is a cutting gate 30, which pivots about the hinge 32. The cutting gate 30 has a length which corresponds to the interior width of the trailer 30, so that, when the cutting gate 30 is pivoted to a position shown in phantom at 30A in FIG. 1, it can contain livestock in the forward portion of the trailer, and, when the cutting gate 30 is pivoted to the point 30B shown in FIG. 1, it lies against the right side 16 of the trailer and leaves the trailer open.

At the back end 20 of the transport trailer 10, slightly inside of the gate 22, is a catch gate 34, which is mounted so as to pivot about the point 36. When the catch gate 34 is pivoted against the left side of the trailer as shown in phantom at 34A, it is out of the way. When the catch gate 34 is pivoted to the position shown in solid lines in FIG. 1, it reaches midway across the trailer's width and closes off the left rear portion of the trailer, so that, if the right gate 24 is closed, the only way livestock can leave the trailer is through the catch gate 34, which will catch and secure each animal as it leaves the trailer 10.

The catch gate 34 is mounted on a floor plate 38, which is a heavy sheet of metal secured to the floor 12. The catch gate 34 will not be described in detail here, because catch gates are well-known. Also mounted on the floor plate 38 is a longitudinal divider 40, which extends from the right edge of the catch gate 34 forward into the trailer at least four feet. The trailer 10 is between five and seven feet wide, and the longitudinal divider 40 is located approximately midway across the width of the trailer 10, so that there is room for an animal on both sides of the divider 40. The longitudinal divider 40 serves to keep the back end of the animal more or less in line with the front end of the animal when it is caught in the catch gate 34. This keeps the animal from twisting around and kicking someone or from twisting out of the catch gate. A rancher can stand to the right of the divider 40 to perform treatments on the animal without getting kicked by the animal.

When the cutting gate 30 is latched to the longitudinal divider 40 as shown in solid lines in FIG. 1, the rancher or veterinarian can stand in the space behind the cutting gate 30 and to the right of the longitudinal divider 40 and be separated from all the animals in the transport trailer 10.

The transport trailer 10 also has a plurality of inverted U-shaped bars 42 mounted to the trailer frame which define the top of the trailer.

Figure 3:
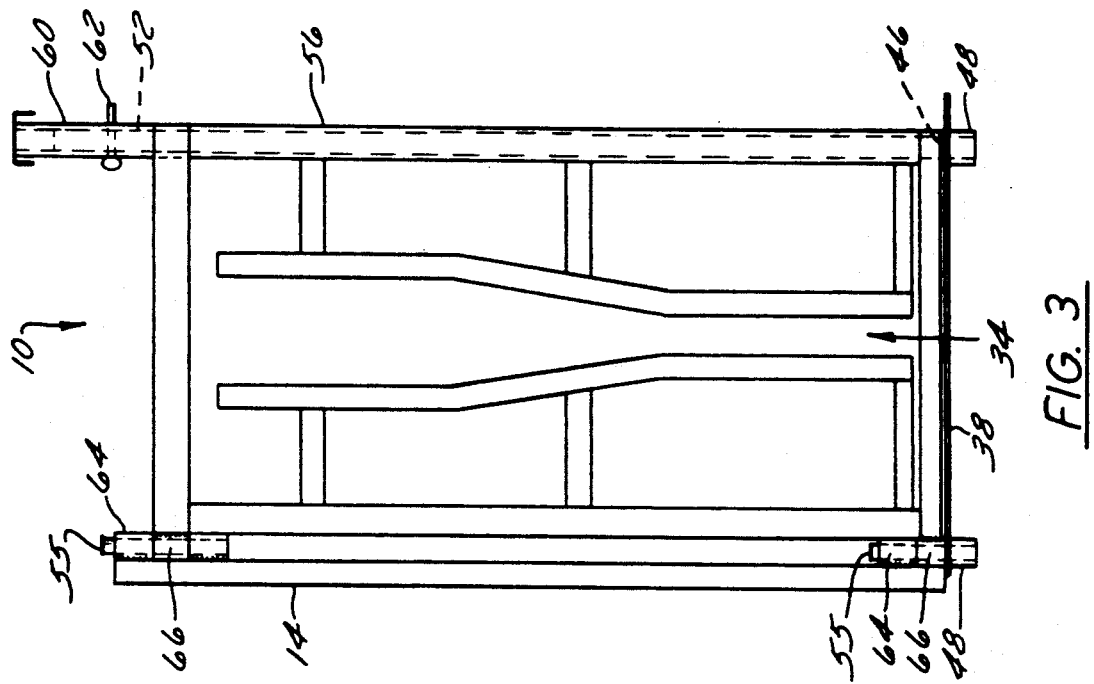
FIG. 3 is an enlarged schematic view of the catch gate shown in FIG. 2.
Figure 5:
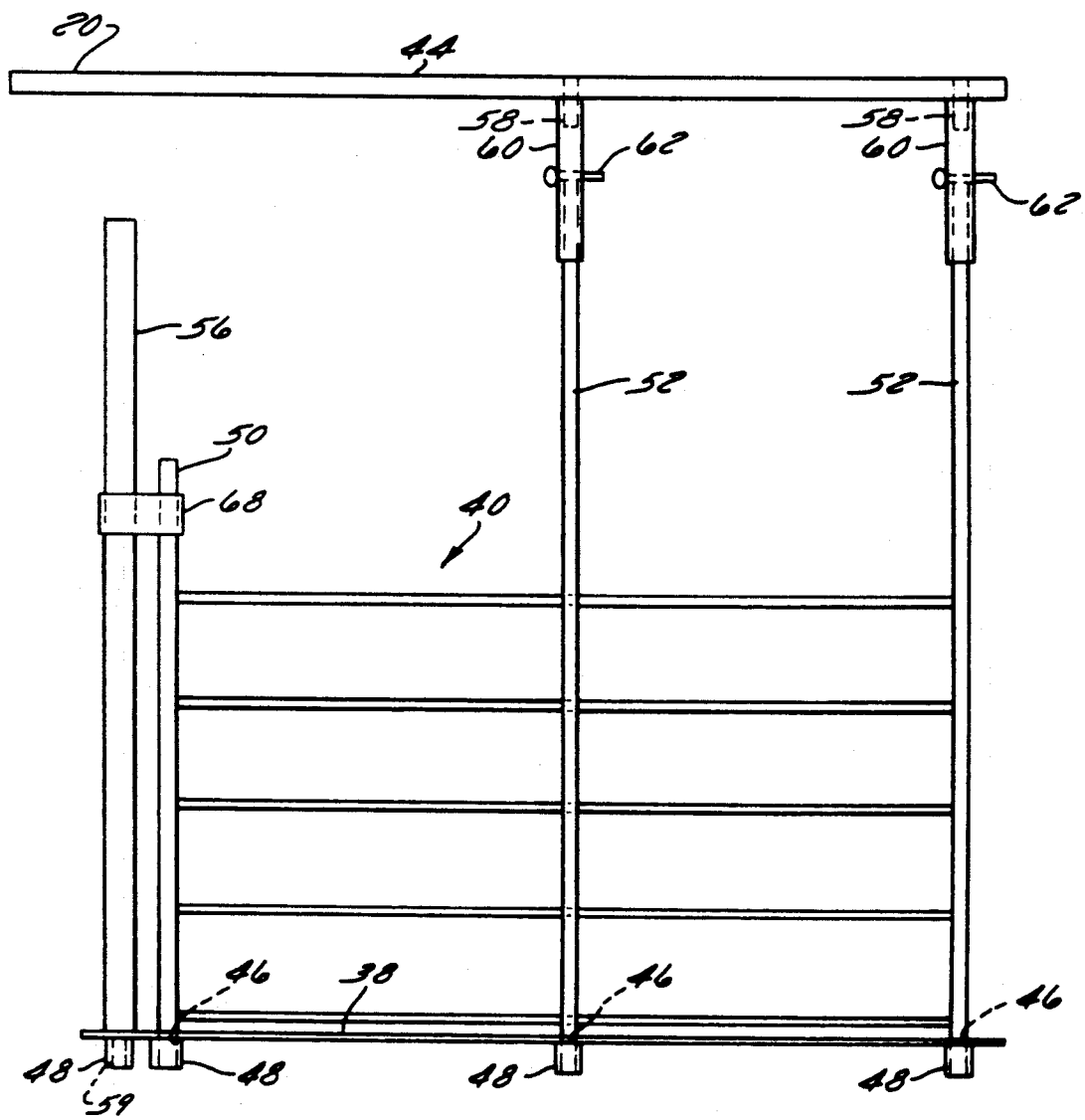
FIG. 5 is an enlarged schematic sectional view of the longitudinal divider portion of the trailer of FIG. 1.

Several modifications are made to a standard transport trailer to permit the installation of the catch gate on the back of the trailer. A longitudinal bar 44 is welded to the center of the back U-shaped bar 42 and to the next two U-shaped bars 42 to provide a support for the longitudinal divider 40. Holes 46 are drilled into the floor of the trailer as shown in FIGS. 3 and 5, and receptacle cups 48 are welded to the underside of the floor plate 38 and fit through the holes 46. These receptacle cups 48 receive the vertical posts 50, 52 of the longitudinal divider and the hinge pin 55 and extension pin 59 of the catch gate 34.

The longitudinal bar 44 includes downwardly-projecting portions 58 which are aligned with their corresponding receptacle cups 48. The tops of the vertical posts 52 are fastened to the downwardly-projecting portions 58 by means of a slip collar 60 and retaining pin 62, as shown in FIG. 5, while the bottoms of the vertical posts 50,52 are held in the receptacle cups 48.

Hinge portions 64 are welded to the left side 14 of the trailer 10, and hinge portions 66 are welded to the left side of the catch gate 34, and the hinge portions 64, 66 are connected together by means of hinge pins 55, with the lower hinge pin 55 also being received in one of the receptacle cups 48 welded to the floor plate 38 and received in a hole in the floor 12. A band 68 fits around the forward post 50 of the longitudinal divider 40 and around the right vertical post 56 of the catch gate 34 to provide support to the catch gate. A latch 70 is provided on the longitudinal divider 40 to fasten the cutting gate 30 to the longitudinal divider 40 as shown in FIG. 1.

Operation of the present invention is as follows:

When the trailer is being used only for transport, the longitudinal divider 40 is removed and strapped to the side of the trailer for storage (not shown). The catch gate 34 is pivoted forward to lie flat against the left side 14 of the trailer as shown in phantom at 34A. The gates 22, 24 are opened to permit livestock to enter or leave the trailer and closed to keep livestock in the trailer.

Figure 2:
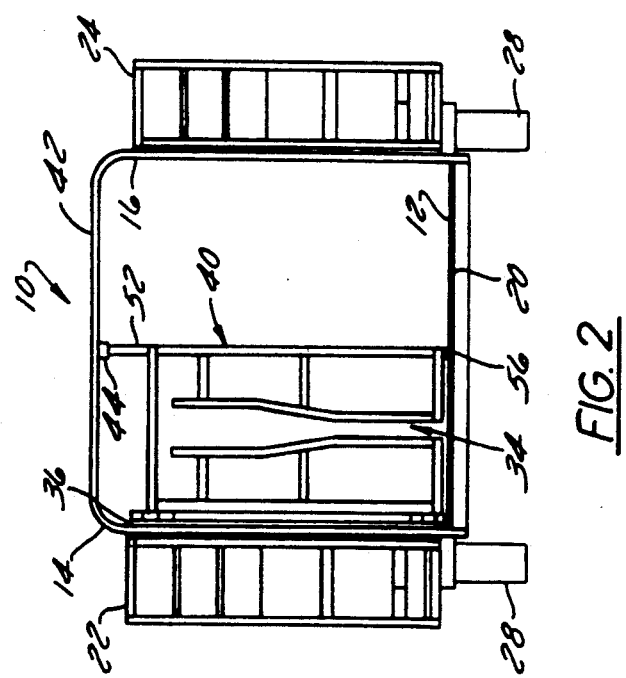
FIG. 2 is a schematic rear view of the livestock transport trailer of FIG. 1.
Figure 4:
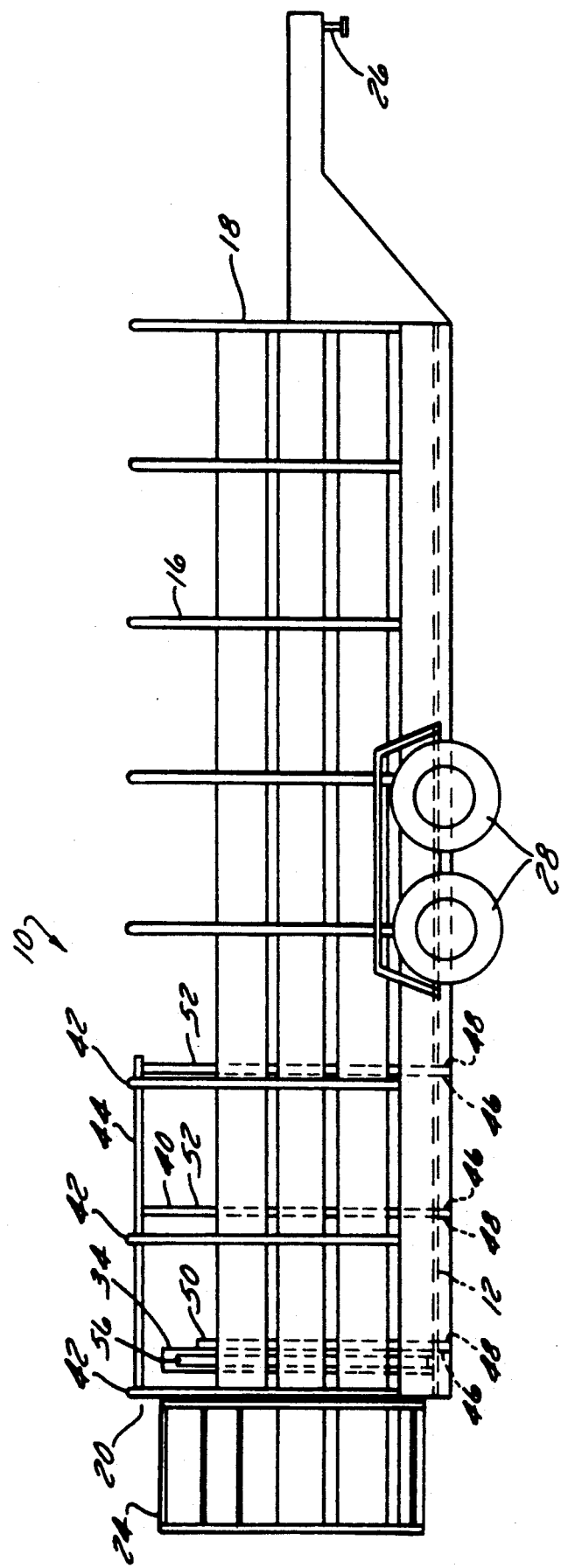
FIG. 4 is a right side view of the trailer of FIG. 1.

If the catch gate is to be used, the catch gate 34 is swung out into the position shown in FIGS. 1-3, and a pin 59 mounted on the vertical post 56 is dropped into its receptacle 48. Then the longitudinal divider 40 is installed by putting the vertical posts 50, 52 into their respective receptacle cups 48, sliding the slip collars 60 up the posts 52 until they surround the vertical projections 58, and inserting the retaining pins 62 through holes in the slip collars 60, so the slip collars 60 cannot slip down off of the vertical projections. Then, the band 68 is slipped down over the vertical post 50 of the longitudinal divider, so as to hold the posts 56 and 50 together.

The livestock are loaded onto the trailer 10 through the right rear side, by opening the right gate 24. If the livestock are to be transported, the gates 22, 24 are closed, and the transport trailer 10 is hitched to a truck and towed to another location. Then, before the livestock are released into the new location, the cutting gate 30 is pivoted forward until it contacts the longitudinal divider 40 and is fastened by the latch 70. This pushes all the livestock forward of the cutting gate 30. Then the gates 22, 24 are opened, and the livestock begin moving toward the catch gate 34, trying to get out of the trailer. (In this description, the catch gate is set up before the cattle are loaded onto the trailer. Alternatively, it could be set up with the cattle already on the trailer.)

When the first animal contacts the catch gate, the catch gate catches the animal and secures the animal's head. The rancher or vet stands in the space between the rear of the trailer and the cutting gate 30 and performs some treatment on the animal, such as giving injections to the animal. When the treatment is finished, the animal is released through the catch gate out into the field, and the next animal contacts the catch gate and is secured in place. This process continues until all the animals have been released from the transport trailer.

Moving the cutting gate 30 forward into the position where it latches onto the longitudinal divider takes up the space of about one animal, so, when this process is to be used, the trailer should transport one fewer animal than usual, i.e. 19 animals instead of 20, or else one animal would have to be removed from a full trailer before the standard process could begin.

After the animals have been treated and released into the field, barn, or pen, the trailer is ready to be used again. The foregoing description shows a trailer that has been retrofit with a catch gate. It would also be possible to simply build the trailer with a catch gate in it. It will be obvious to those skilled in the art that modifications may be made to the embodiment described above without departing from the scope of the present invention.

What is claimed is:

1. In a livestock transport trailer, comprising a floor, wheels which support the floor, a trailer hitch at one end and an entrance gate at the other end, the improvement comprising:

a catch gate mounted at the end of the transport trailer adjacent to the entrance gate, such that cattle can enter the trailer through the entrance gate and can leave the trailer at the same end through the catch gate, which permits the rancher to catch, inspect, and treat each animal as it leaves the trailer.

2. In a livestock transport trailer as recited in claim 1, wherein said trailer is at least five feet wide so that it is wide enough to accommodate at least two cattle across its width.

3. In a livestock transport trailer as recited in claim 2, wherein said catch gate occupies about half the width of the trailer.

4. In a livestock transport trailer as recited in claim 1, and further comprising a longitudinal divider mounted on said trailer and extending from the catch gate forward into the trailer at least four feet to provide the rancher a place to stand while working on the animal caught in the catch gate.

5. In a livestock transport trailer as recited in claim 4, wherein said trailer further comprises a cutting gate, and including a latch for connecting the cutting gate to the longitudinal divider so as to provide an area for the rancher which is free from animals.

6. In a livestock transport trailer as recited in claim 1, wherein said trailer includes a left side and a right side, and wherein said catch gate is mounted so that one side of the catch gate is pivotably mounted adjacent to one of the sides of the trailer so that, when not in use, said catch gate can be pivoted to stand flat against said one side, thereby occupying very little floor space in the trailer.

7. A catch gate system for a transport trailer, comprising:
- a catch gate, including left and right vertical support posts;
- a hinge mounted on one of said vertical support posts so that said catch gate may be pivotably mounted in the trailer;
- a longitudinal divider at least four feet long, said longitudinal divider including a plurality of vertical support posts; and
- a plurality of receptacle cups for receiving said vertical support posts.

8. A catch gate system for a transport trailer, as recited in claim 7, and further comprising:
- a floor plate, defining a plurality of holes which receive said receptacle cups.

9. A catch gate system for a transport trailer as recited in claim 8, and further comprising:
- a longitudinal bar adapted to be fastened to the top of said trailer, said longitudinal bar having projections, with the spaces between the projections being located so that said projections can be aligned with the holes in said floor plate, such that said vertical support posts of said longitudinal divider can be received by said holes and fastened to said projections.

10. A livestock transport trailer, comprising:
- a floor, a closed front end, with a trailer hitch located at the front end; left and right sides, a top, and a back, with a closeable gate located at the back;
- a catch gate mounted at the back of the trailer, with one of the sides of the catch gate adjacent to one of the sides of the trailer and the other side of the catch gate located approximately midway across the trailer.

11. A livestock transport trailer as recited in claim 10, and further comprising a longitudinal divider extending from the side of the catch gate, which is midway across the trailer, forward into the trailer to prevent an animal that is caught in the catch gate from turning sideways in the trailer.

12. A livestock transport trailer as recited in claim 11, wherein said longitudinal divider is supported on vertical posts which are secured to the trailer at their top and bottom ends.

* * * * *